(12) United States Patent
Oogose et al.

(10) Patent No.: US 10,588,303 B2
(45) Date of Patent: Mar. 17, 2020

(54) DUAL-BEARING REEL

(71) Applicant: Shimano Inc., Sakai, Osaka (JP)

(72) Inventors: Hiroki Oogose, Osaka (JP); Motohiro Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/150,785

(22) Filed: Oct. 3, 2018

(65) Prior Publication Data

US 2019/0141972 A1   May 16, 2019

(30) Foreign Application Priority Data

Nov. 10, 2017   (JP) ................................. 2017-217785

(51) Int. Cl.
 *A01K 89/01*    (2006.01)
 *A01K 89/015*   (2006.01)

(52) U.S. Cl.
 CPC .... *A01K 89/01923* (2015.05); *A01K 89/0192* (2015.05); *A01K 89/0193* (2015.05)

(58) Field of Classification Search
 None
 See application file for complete search history.

(56) References Cited

U.S. PATENT DOCUMENTS

| | | | | |
|---|---|---|---|---|
| 5,120,002 A | * | 6/1992 | Kawai | A01K 89/01921 242/314 |
| 5,429,318 A | * | 7/1995 | Sato | A01K 89/01916 242/314 |
| 6,206,312 B1 | * | 3/2001 | Oh | A01K 89/01921 242/314 |
| 6,367,726 B1 | * | 4/2002 | Hyon | A01K 89/01923 242/314 |
| 8,235,320 B2 | * | 8/2012 | Kawasaki | A01K 89/0192 242/310 |
| 8,820,670 B2 | * | 9/2014 | Takechi | A01K 89/058 242/303 |
| 2003/0111569 A1 | * | 6/2003 | Hitomi | A01K 89/011223 242/321 |
| 2003/0209621 A1 | * | 11/2003 | Maeda | A01K 89/00 242/321 |

(Continued)

FOREIGN PATENT DOCUMENTS

| | | |
|---|---|---|
| JP | 63-263033 A | 10/1988 |
| JP | 6-20388 Y2 | 6/1994 |

(Continued)

*Primary Examiner* — Emmanuel M Marcelo
(74) *Attorney, Agent, or Firm* — Global IP Counselors, LLP

(57) ABSTRACT

A dual-bearing reel includes a spool, a spool shaft, a spool supporting portion, a reel body, and a rotating member. The rotating member is disposed to be capable of rotating between a first position in which the spool supporting portion can be removed from the reel body and a second position in which the spool supporting portion cannot be removed from the reel body. In the first position the radially outside portion of the rotating member is disposed spaced apart from the reel body in at least one of a radial direction and an axial direction. In the second position the radially outside portion is disposed on the inside of the outer surface of the body portion in the radial direction, when viewing the rotating member from the outside in the axial direction.

9 Claims, 9 Drawing Sheets

(56) References Cited

U.S. PATENT DOCUMENTS

2005/0056716 A1\* 3/2005 Kawasaki .............. A01K 89/00
                                                                                                                 242/310
2016/0015015 A1\* 1/2016 Niitsuma ......... A01K 89/01555
                                                                                                                 242/288

FOREIGN PATENT DOCUMENTS

| JP | 8-10279 Y2 | 3/1996 |
| JP | 5775298 B2 | 7/2015 |

\* cited by examiner

DUAL-BEARING REEL

CROSS-REFERENCE TO RELATED APPLICATIONS

This application claims priority to Japanese Patent Application No. 2017-217785, filed on Nov. 10, 2017. The entire disclosure of Japanese Patent Application No. 2017-217785 is hereby incorporated herein by reference.

BACKGROUND

Field of the Invention

The present invention relates to a dual-bearing fishing reel.

Background Art

A conventional dual-bearing fishing reel comprises a spool, a spool shaft, a left frame (body portion), and a left-side cover (rotating member) turnably mounted on the left frame (refer to Japanese Laid Open Patent Application No. Sho 63(1988)-263033 and Japanese Patent No. 5775298).

In addition, a conventional dual-bearing fishing reel comprises a spool, a spool shaft, a left frame (body portion), and a spool supporting portion detachably fitted to the left frame (refer to Japanese Unexamined Utility Model Application Publication Nos. Hei 6 (1994)-20388 and Hei 8 (1996)-10289).

In the dual-bearing fishing reels shown in Japanese Laid Open Patent Application No. Sho 63(1988)-263033 and Japanese Patent No. 5775298, the spool is attached to/detached from the frame by turning the left-side cover (3, 3a; rotating member) with respect to the left frame (2a; body portion).

In this design, a joint surface is formed between the left-side cover and the left frame. Therefore, when an angler palms the reel and this joining surface contacts the palm of the angler's hand, this contact can cause discomfort to the angler.

In particular, when a fish is caught on the fishing line and the angler strongly palms the reel, a gap can form between the joining surface of the left-side cover and the joining surface of the left frame. In that case, the discomfort of the angler can even be greater.

In addition, in the dual-bearing reels shown in Japanese Unexamined Utility Model Application Publication Nos. Hei 6 (1994)-20388 and Hei 8 (1996)-10289 the spool is attached to/detached from the frame by removing the spool supporting portion (7, 6) from the left frame (1, 4) and attaching the spool supporting portion to the left frame.

In the dual-bearing reel of Japanese Unexamined Utility Model Application Publication No. Hei 6 (1994)-20388, it is necessary to raise a thin detent projection and to pull the detent projection with a finger in order to remove the spool supporting portion from the left frame; therefore, it is difficult to remove the spool supporting portion from the frame.

In the dual-bearing reel of Japanese Unexamined Utility Model Application Publication No. Hei 8 (1996)-10289, to remove the spool supporting portion from the left frame, it is necessary to rotate the spool supporting portion and then place a finger on a finger-hooking recess which is shallow and difficult to hook a finger onto, and forcibly pull out the spool supporting portion, or to push a flange on the spool toward the spool supporting portion; therefore, it is difficult to operate the spool supporting portion.

SUMMARY

The present invention was made in light of the above-described problems, an object of the present invention is to provide a dual-bearing reel with which an angler can grip the body portion without discomfort, and can easily remove the spool supporting portion from the body portion.

A dual-bearing reel according to one aspect of the present invention comprises a spool, a spool shaft, a spool supporting portion, a body portion, and a rotating member. A fishing line is wound around the spool. The spool shaft is disposed at the rotational center of the spool. The spool supporting portion is configured so as to be capable of supporting one end of the spool shaft. The spool supporting portion is detachably attached to the body portion.

The rotating member is configured so as to be capable of connecting the spool supporting portion to the body portion. The rotating member is disposed so as to be capable of rotating between a first position in which the spool supporting portion can be removed from the body portion and a second position in which the spool supporting portion cannot be removed from the body portion.

In the first position the radially outside portion of the rotating member is disposed spaced apart from the body portion in at least one of a first radial direction away from the rotational center of the spool and a first axial direction along the rotational center of the spool. In the second position the radially outside portion of the rotating member is disposed on the inside of the outer surface of the body portion in the first radial direction, when viewing the rotating member from the outside in the first axial direction.

In the present dual-bearing reel, when the rotating member is in the second position, the radially outside portion thereof is disposed on the inside of the outer surface of the body portion in the first radial direction, when viewing the rotating member from the outside in the first axial direction; therefore, the angler can grip the body portion without discomfort.

In addition, when the rotating member is in the first position the radially outside portion of the rotating member is disposed spaced apart from the body portion in at least one of a first radial direction away from the rotational center of the spool and a first axial direction along the rotational center of the spool. Therefore, when the rotating member is in the first position the angler can easily operate the radially outside portion of the rotating member, and can easily remove the spool supporting portion from the body portion.

In a dual-bearing reel according to another aspect of the present invention, when the rotating member is in the first position, the radially outside portion preferably is disposed so as to be operable by the distance described above, in order to remove the spool supporting portion from the body portion. Here, when the rotating member is in the second position the radially outside portion is disposed such that the body portion can be gripped.

With this configuration, when the rotating member is in the first position the angler can easily remove the spool supporting portion from the body portion. In addition, when the rotating member is in the second position the angler can grip the body portion without discomfort.

In a dual-bearing reel according to another aspect of the present invention the rotating member preferably is configured to be movable relative to the body portion in a first axial direction away from the spool when in the first position.

When in the second position the rotating member is configured so as to be immovable relative to the body portion in the first axial direction.

With this configuration, when in the first position the spool supporting portion can easily be removed from the body portion by using the rotating member. In addition, when in the second position it is possible to secure the spool supporting portion to the body portion via the rotating member.

In a dual-bearing reel according to another aspect of the present invention the body portion preferably has an opening for disposing the rotating member. Here, the radially outside portion is disposed on the outside of the opening.

With this configuration the spool supporting portion can easily be attached to the body portion by the rotating member, and the spool supporting portion can easily be removed from the body portion by the rotating member.

In a dual-bearing reel according to another aspect of the present invention the radially outside portion preferably has a projecting portion. When the rotating member is in the first position the projecting portion protrudes farther outside than the body portion in a second radial direction away from the rotational center. Here, the distal end portion of the projecting portion is disposed spaced apart from the body portion in the second radial direction.

With this configuration the angler can easily remove the spool supporting portion from the body portion by using the projecting portion that is disposed spaced apart from the body portion.

In a dual-bearing reel according to another aspect of the present invention a gap preferably is disposed between the projecting portion and the outer surface of the body portion.

With his configuration sliding resistance does not occur between the projecting portion and the outer surface of the body portion when rotating the rotating member, so it is possible to rotate the rotating member smoothly.

In a dual-bearing reel according to another aspect of the present invention the body portion preferably has a stepped portion. When the rotating member is in the second position, the stepped portion opposes the projecting portion in the first axial direction.

With this configuration, when the rotating member is in the second position the angler can grip the body portion without discomfort, by causing the projecting portion to oppose the stepped portion of the body portion.

In a dual-bearing reel according to another aspect of the present invention the radially outside portion preferably has an opposing portion. When the rotating member is in the first position, the opposing portion is disposed opposing the body portion in the second axial direction along the rotational center. Here, the outer peripheral portion of the opposing portion is disposed spaced apart from the body portion in the second axial direction.

With this configuration the angler can easily remove the spool supporting portion from the body portion by using the opposing portion that is disposed spaced apart from the body portion.

In a dual-bearing reel according to another aspect of the present invention, the radially outside portion preferably has a projecting portion and an opposing portion. When the rotating member is in the first position, the projecting portion protrudes farther outside than the body portion in a second radial direction away from the rotational center. The distal end of the projecting portion is disposed spaced apart from the body portion in the second radial direction.

When the rotating member is in the first position, the opposing portion is disposed opposing the body portion in the second axial direction along the rotational center. The outer peripheral portion of the opposing portion is disposed spaced apart from the body portion in the second axial direction.

With this configuration the angler can easily remove the spool supporting portion from the body portion using the projecting portion and the opposing portion that are disposed spaced apart from the body portion.

By the present invention, an angler can grip the body portion without discomfort and can easily remove the spool supporting portion from the body portion, in a dual-bearing reel.

DETAILED DESCRIPTION OF THE EMBODIMENTS

Overall Structure of the Dual-Bearing Reel

Figure 1:
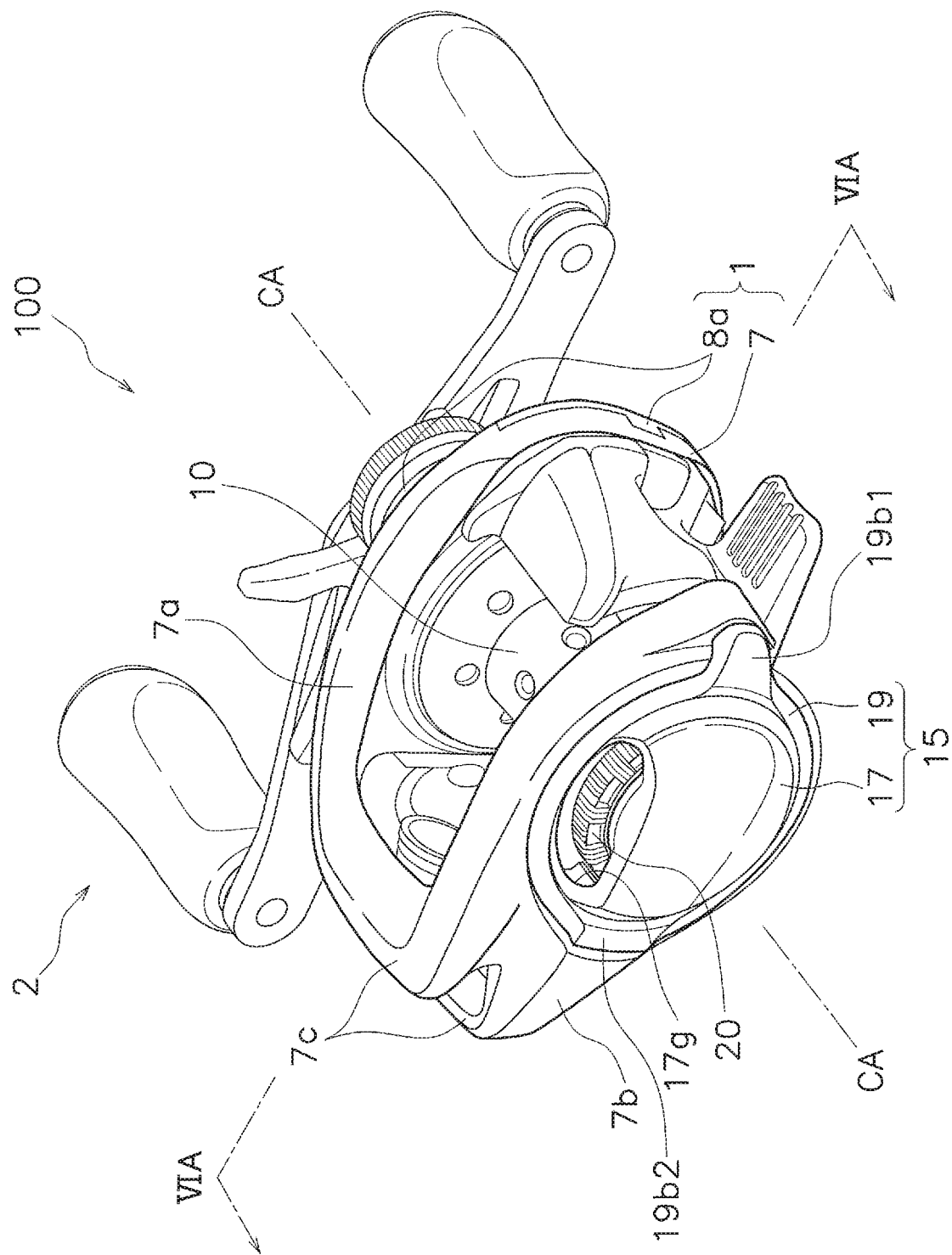
FIG. 1 is a perspective view of a dual-bearing reel.
Figure 2A:
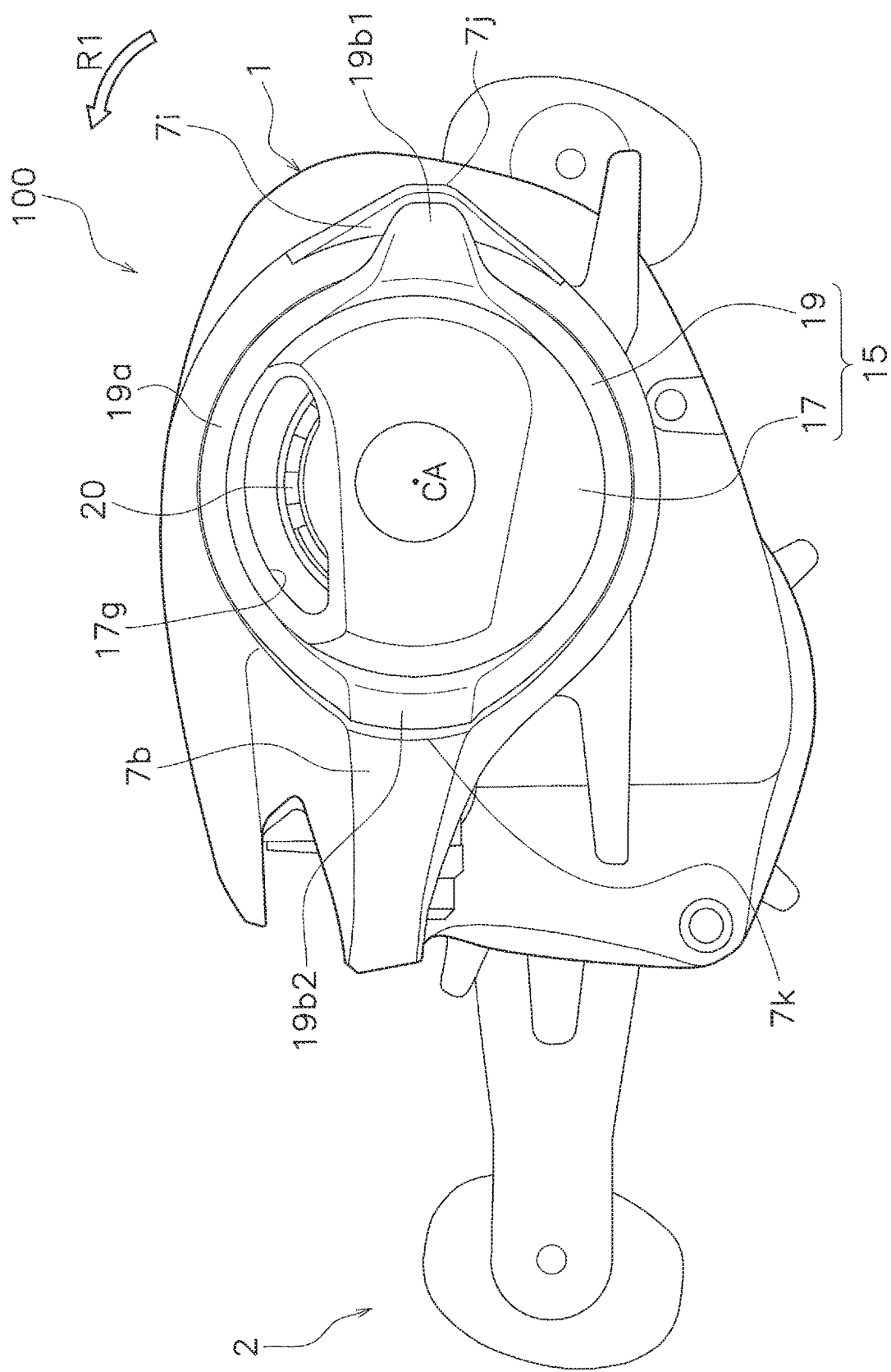
FIG. 2A is a side view of the dual-bearing reel (mounting position).
Figure 2B:
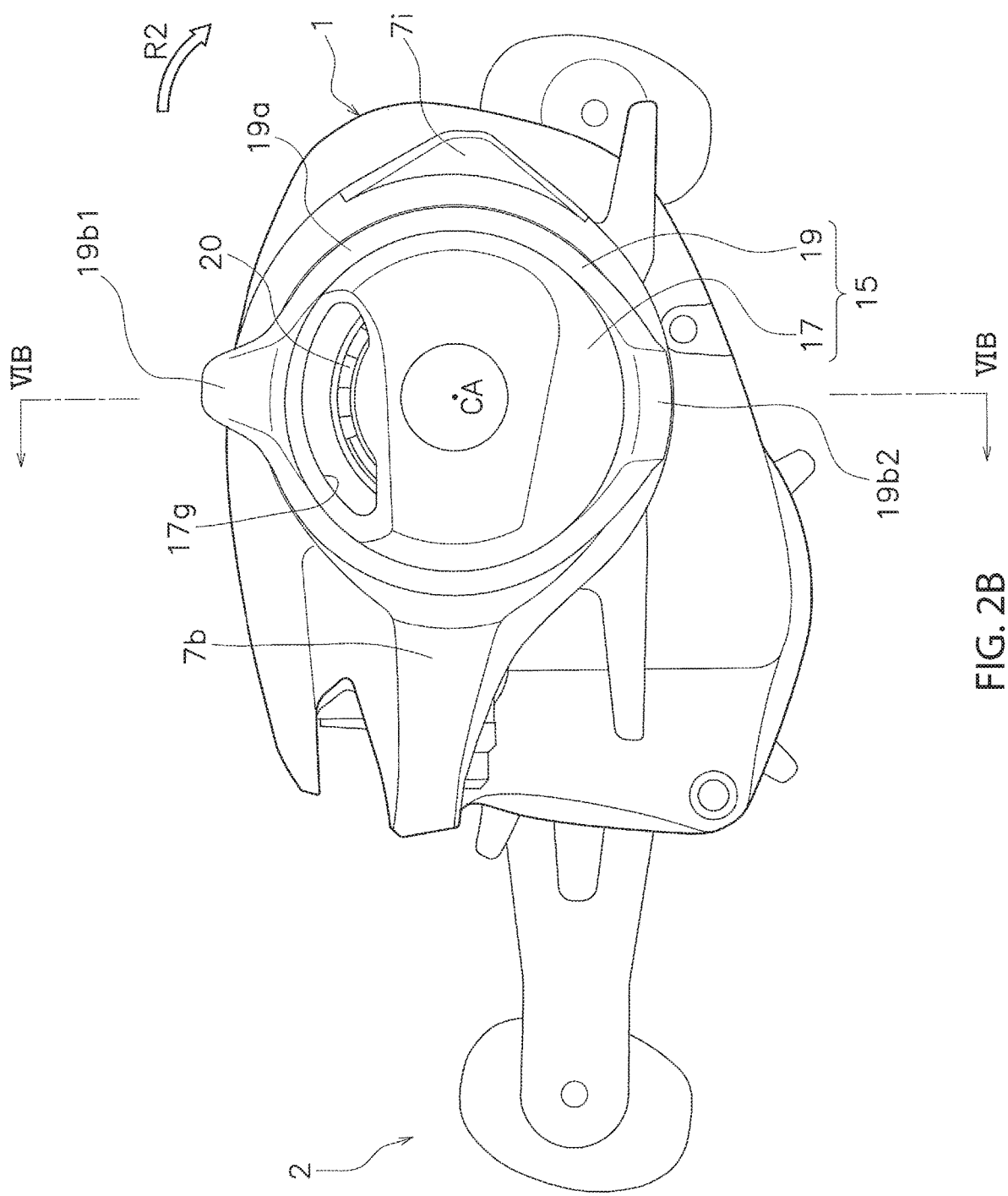
FIG. 2B is a side view of the dual-bearing reel (detaching position).

As shown in FIGS. 1, 2A, and 2B, a dual-bearing reel 100 according to an embodiment of the present invention comprises a reel body 1 (one example of a body portion), a handle 2, a spool 10 (refer to FIG. 1), a spool shaft 14 (refer to FIGS. 6A and 6B), and a spool supporting structure 15.

The "axial direction" used hereinbelow is defined as a direction in which the rotational center of the spool 10, i.e., the spool axis CA, extends, or as a direction along the spool axis CA. The spool axis CA is coaxial with the axis of the spool shaft 14. Accordingly, the "axial direction" can be interpreted to be a direction in which the spool shaft 14 extends, or a direction along the spool shaft 14.

The "radial direction" is defined as a direction away from the spool axis CA, and a direction away from the spool axis CA. The "circumferential direction" is defined as the direction around the spool axis CA.

As shown in FIGS. 1, 2A, and 2B, the handle 2, the spool 10 (refer to FIG. 1), the spool shaft 14 (refer to FIGS. 6A and 6B), and the spool supporting structure 15 are mounted on the reel body 1. Details of the reel body 1 will be described later.

The handle 2 is configured so as to be able to rotate the spool 10. In particular, the handle 2 is configured so as to rotationally drive the spool 10, and is rotatably disposed on the side of the reel body 1. The handle 2 is disposed on a side cover 8a side, which is described later.

The direction in which the handle 2 rotates when the handle 2 is rotated while the dual-bearing reel 100 is mounted on a fishing rod is referred to as the "line winding direction." In addition, the direction in which the fishing line is unreeled or cast is defined as the front, and the opposite direction is defined as the rear. The direction approaching the fishing rod is defined as down, and the direction away from the fishing rod is defined as up.

A fishing line is wound around the spool 10. The spool 10 has the spool axis CA described above. The spool 10 is rotatably supported by the reel body 1. Here, the spool 10 is mounted on the spool shaft 14 so as to be able to rotate integrally. The spool 10 is rotatably supported by the reel body 1 via the spool shaft 14. The spool shaft 14 is disposed on the spool axis CA. Here, the spool shaft 14 is configured so as to be able to rotate integrally with the spool 10. The spool shaft 14 is rotatably supported by the reel body 1.

Reel Body

As shown in FIG. 1, the reel body 1 comprises a frame 7 and a side cover 8a.

The frame 7 has a first side plate 7a, a second side plate 7b, and a plurality of connecting portions 7c. The spool 10 is disposed between the first side plate 7a and the second side plate 7b. The first side plate 7a is disposed on the handle 2 side. The first side plate 7a rotatably supports the spool shaft 14 via a bearing, which is not shown.

The second side plate 7b is disposed on the side opposite the handle 2. The second side plate 7b is disposed spaced apart from the first side plate 7a in the axial direction.

Figure 3A:
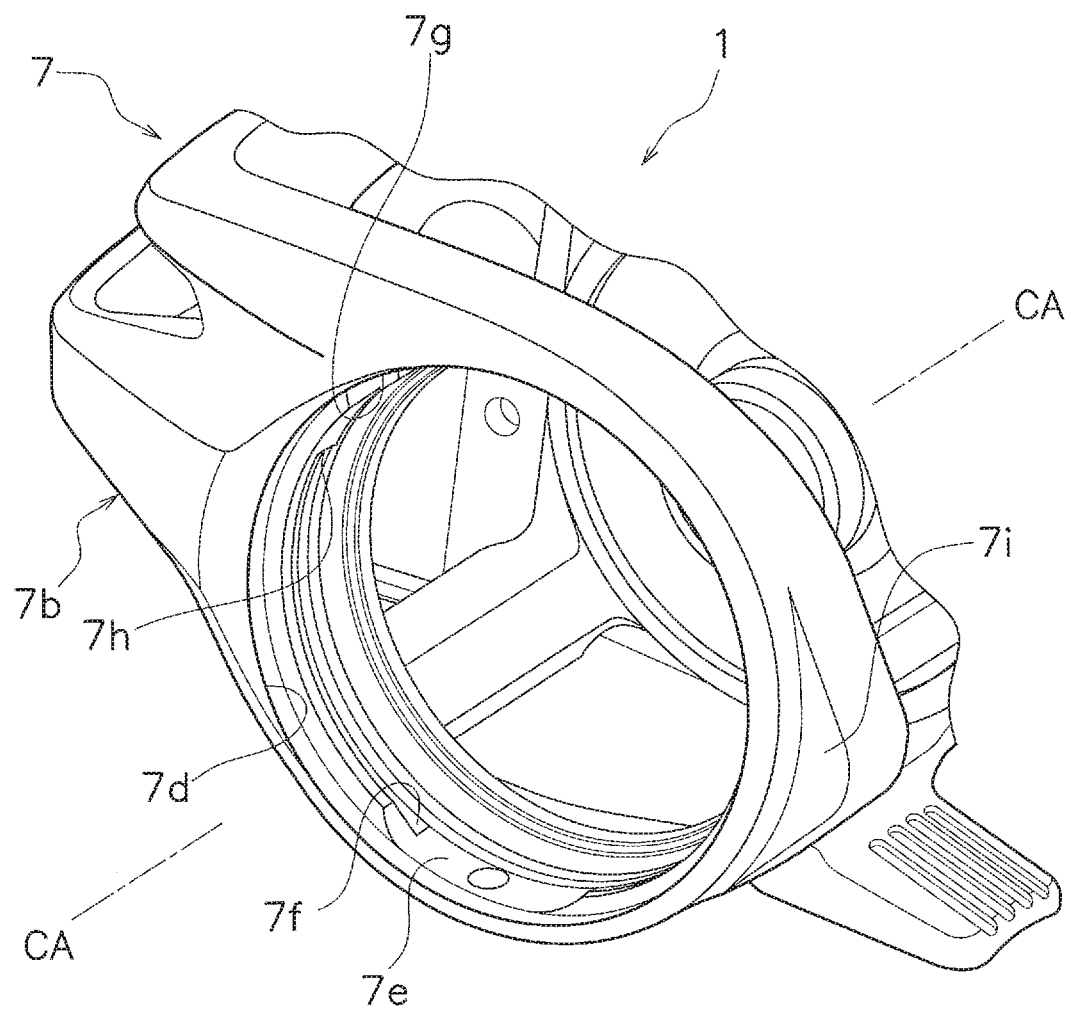
FIG. 3A is a perspective view of a second side plate.
Figure 3B:
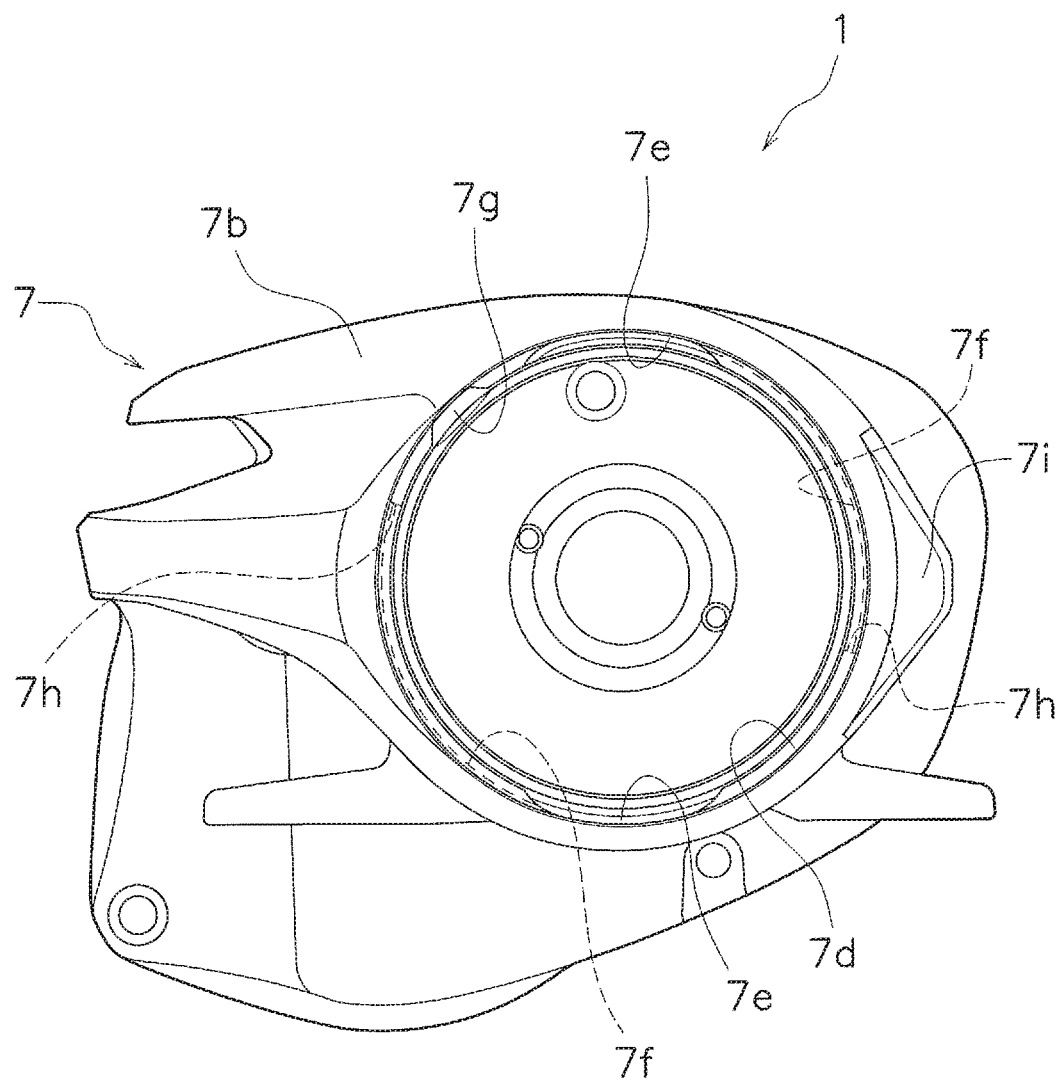
FIG. 3B is a side view of the second side plate.

As shown in FIGS. 3A and 3B, the second side plate 7b has an opening 7d for attaching and detaching the spool 10, and a stepped portion 7i for disposing a first operating portion 19b1 of the rotating member 19 (described later). The opening 7d extends through the second side plate 7b in the spool shaft direction. The opening 7d is formed in a substantially cylindrical shape.

The rotating member 19 is disposed in the opening 7d. The opening 7d includes a guide recess 7e, a bayonet groove 7f, and a positioning recess 7g. The guide recess 7e guides a bayonet 19d (described later) of the rotating member 19 to the bayonet groove 7f. The guide recess 7e is disposed on the inner circumferential surface of the opening 7d. Here, a plurality of (for example, two) guide recesses 7e are formed on the inner circumferential surface of the opening 7d.

As shown in FIG. 3A, each guide recess 7e is a groove extending in the axial direction. Each guide recess 7e extends in the axial direction from the outer surface of the second side plate 7b toward the bayonet groove 7f.

As shown in FIG. 3B, the guide recesses 7e are disposed spaced apart from each other in the circumferential direction. For example, the guide recesses 7e are arranged at intervals of 180 degrees in the circumferential direction. That is, the guide recesses 7e are disposed facing each other in the radial direction. Here, one guide recess 7e is disposed on the fishing rod side, that is, on the lower side of the opening 7d. The other guide recess 7e is disposed away from the fishing rod, that is, on the upper side of the opening 7d. The configuration of the other guide recess 7e is the same as the configuration of the one guide recess 7e.

As shown in FIGS. 3A and 3B, the bayonet groove 7f guides the bayonet 19d of the rotating member 19 in the circumferential direction. The bayonet groove 7f is disposed on the inner circumferential surface of the opening 7d. Here, a plurality of (for example, two) bayonet grooves 7f are disposed on the inner circumferential surface of the opening 7d.

Each bayonet groove 7f extends in the circumferential direction. Each bayonet groove 7f extends in the circumferential direction from each guide recess 7e. For example, one bayonet groove 7f extends from the lower guide recess 7e toward the upper guide recess 7e. In particular, as shown in FIG. 3B, when viewing the second side plate 7b from the outside in the axial direction, the one bayonet groove 7f extends from the lower guide recess 7e in the clockwise circumferential direction. The distal end portion 7h of the one bayonet groove 7f is disposed spaced apart from the upper guide recess.

The configuration of the other bayonet groove 7f is substantially the same as the configuration of the one bayonet groove 7f described above. The other bayonet groove 7f extends from the upper guide recess 7e toward the lower guide recess 7e. In particular, as shown in FIG. 3B, when viewing the second side plate 7b from the outside in the axial direction, the other bayonet groove 7f extends from the upper guide recess 7e in the clockwise circumferential direction. The distal end portion 7h of the other bayonet groove 7f is disposed spaced apart from the lower guide recess 7e.

A bayonet 19d can abut the distal end portion 7h of each of a plurality of bayonet grooves 7f. The rotating member 19 is thereby positioned in the circumferential direction.

As shown in FIGS. 3A and 3B, the positioning recess 7g restricts the rotation of the spool supporting portion 17. The positioning recess 7g is disposed on the inner circumferential surface of the opening 7d. Here, at least one (for example, one) positioning recess 7g is formed on the inner circumferential surface of the opening 7d. The positioning recess 7g is a groove extending in the axial direction. The positioning recess 7g is disposed between the distal end portion 7h of the one bayonet groove 7f and the upper guide recess in the radial direction.

Figure 6A:
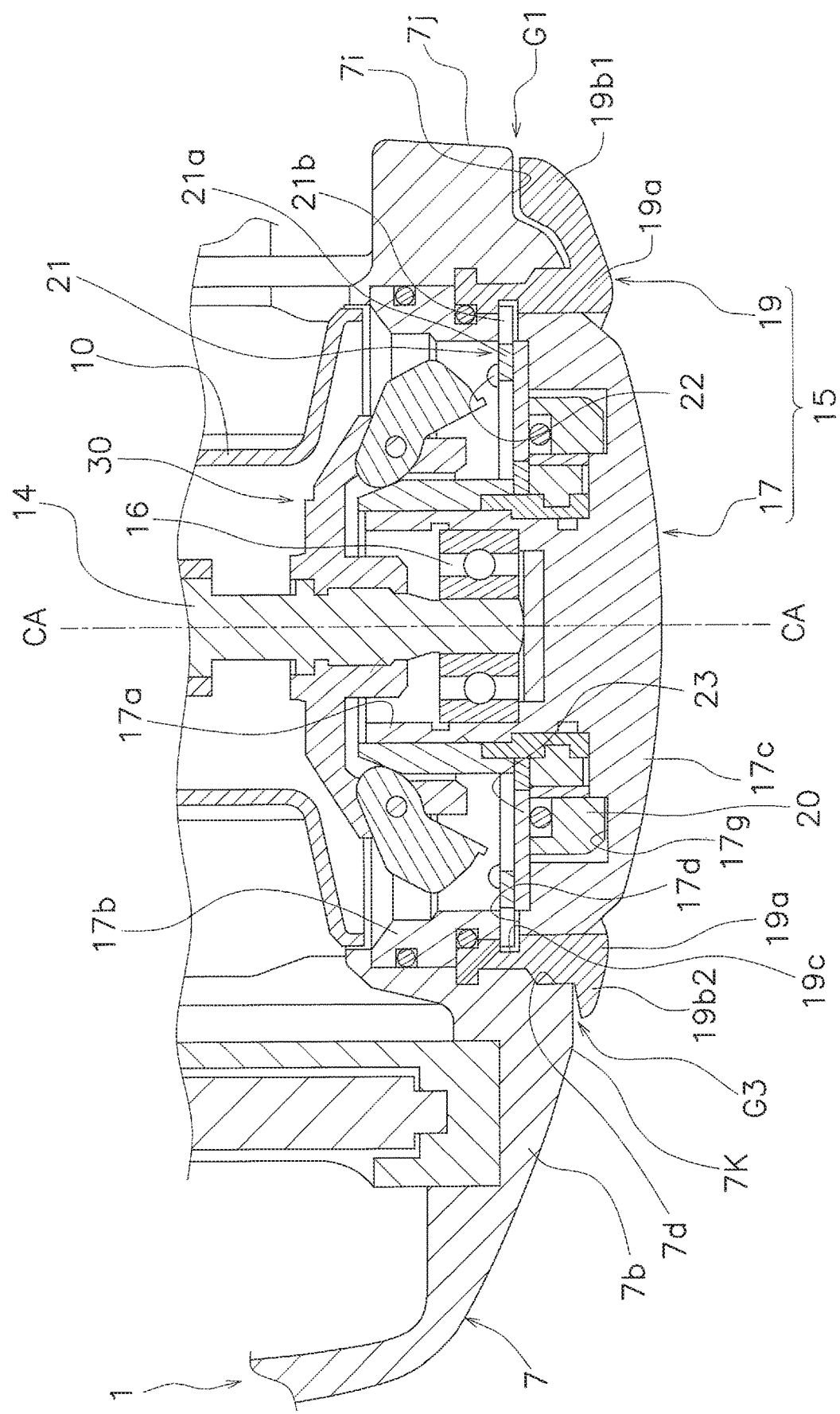
FIG. 6A is a partially enlarged cross-sectional view along the section line VIA-VIA in FIG. 1.

As shown in FIGS. 3A and 3B, the stepped portion 7i is disposed on the second side plate 7b of the frame 7. The stepped portion 7i is disposed on the outside of the opening 7d in the radial direction. For example, the stepped portion 7i is disposed on the outside of the opening 7d in the radial direction, on the side opposite the line-feeding direction, for example behind the second side plate 7b. As shown in FIGS. 2A and 6A, the stepped portion 7i opposes the first operating portion 19b1 in the axial direction when the rotating member 19, which is described later, is in a mounting position.

As shown in FIG. 1, the plurality of connecting portions 7c connect the first side plate 7a and the second side plate 7b. The plurality of connecting portions 7c connect the first side plate 7a and the second side plate 7b to each other at the front, rear, and lower portions of the first side plate 7a and the second side plate 7b. A rod mounting leg portion for a fishing rod is integrally formed on the lower connecting portion.

As shown in FIG. 1, the side cover 8a covers the frame 7 on the handle 2 side. In particular, the side cover 8a is mounted on the first side plate 7a and covers the first side plate 7a. The side cover 8a rotatably supports one end of the spool shaft 14 via a bearing, which is not shown.

Configuration of the Spool Supporting Structure

Figure 6B:
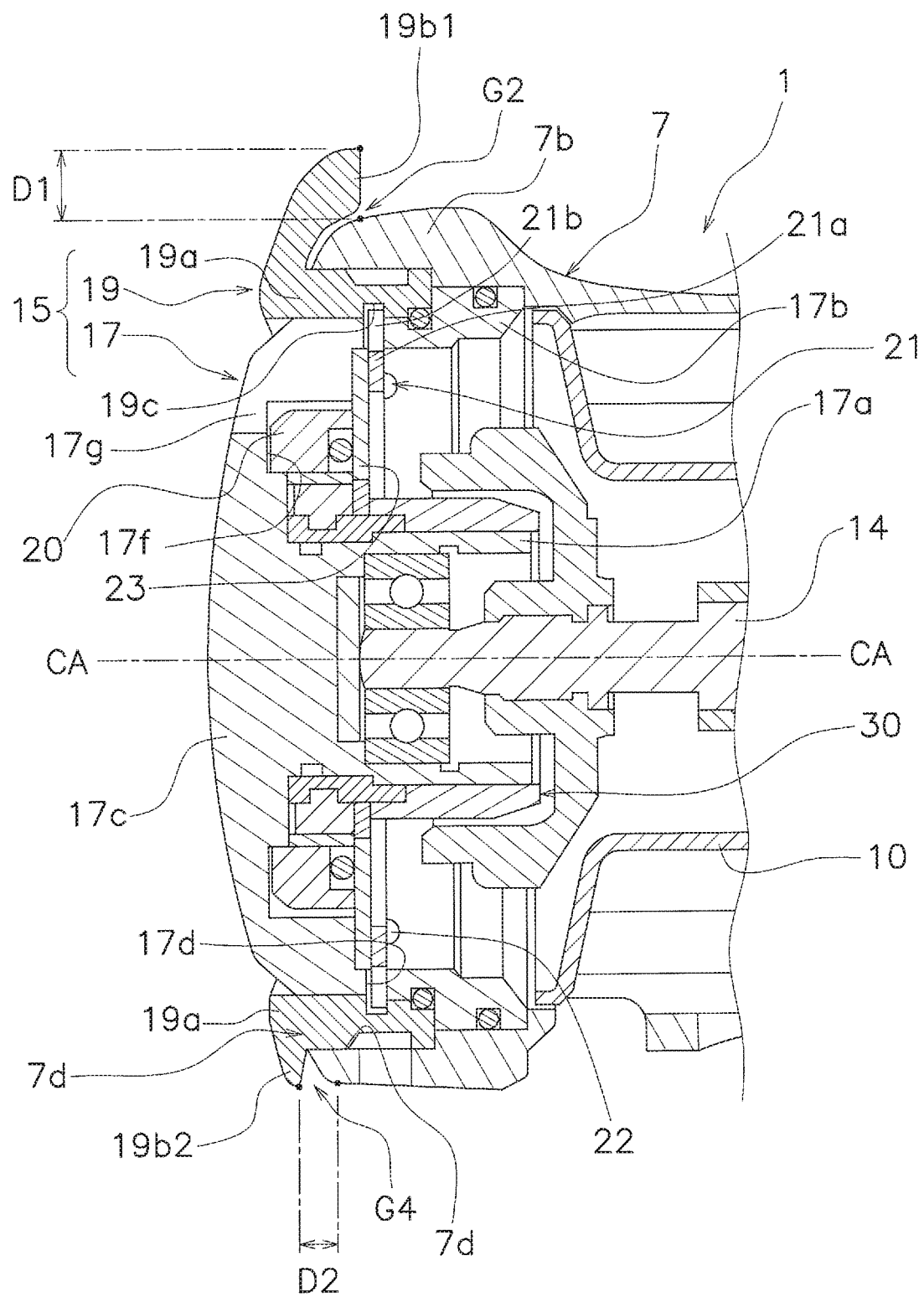
FIG. 6B is a partially enlarged cross-sectional view along the section line VIB-VIB in FIG. 2B.

The spool supporting structure 15 supports the spool shaft 14 (refer to FIGS. 6A and 6B). In particular, the spool supporting structure 15 rotatably supports the other end of the spool shaft 14.

Figure 4:
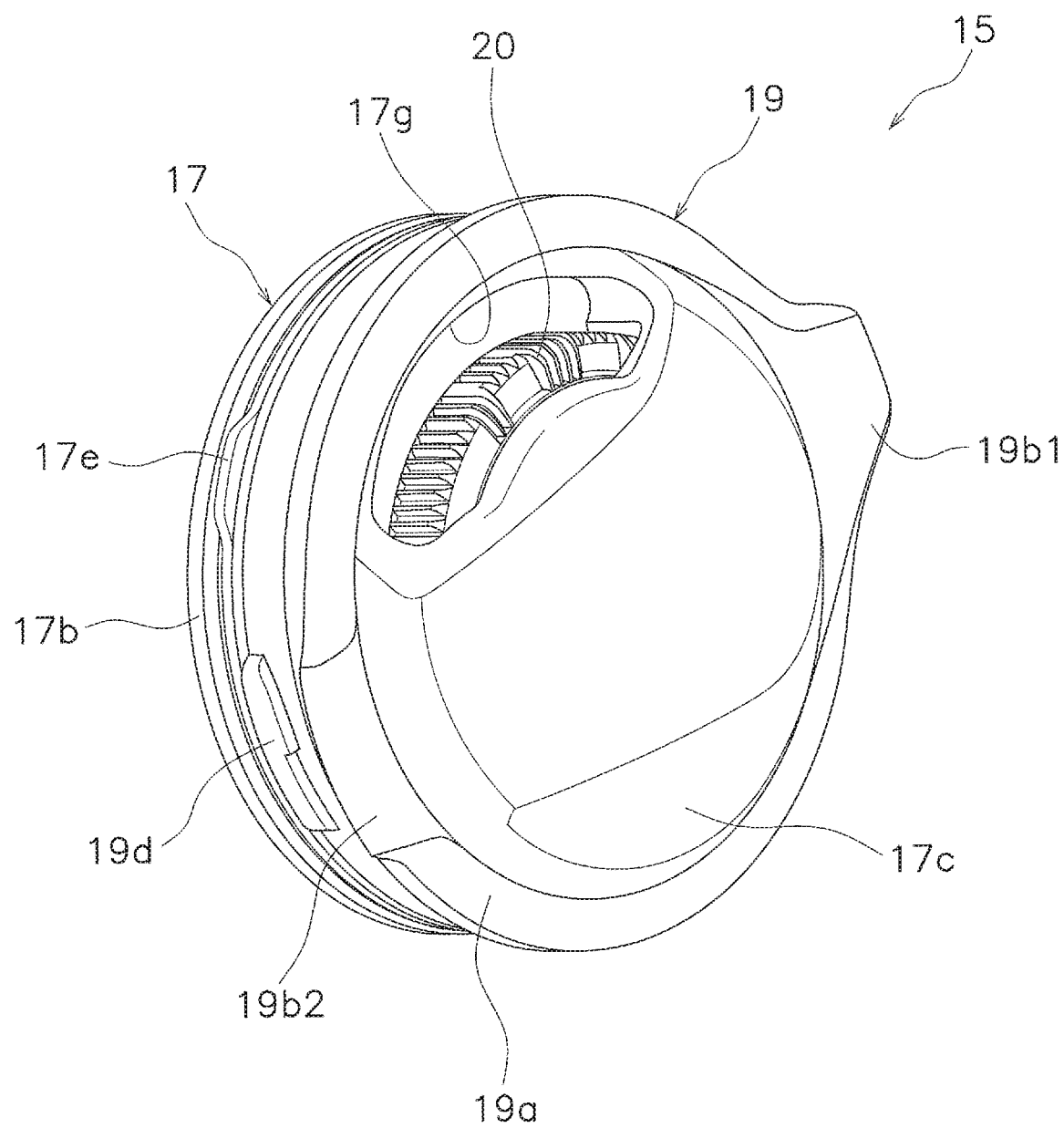
FIG. 4 is a perspective view of a spool supporting structure.

As shown in FIG. 1, the spool supporting structure 15 is detachably mounted on the reel body 1. Here, the spool supporting structure 15 is detachably mounted on the frame 7 on the opposite side of the handle 2. In particular, as shown in FIGS. 1, 3A, and 4, the spool supporting structure 15 is detachably mounted to the opening 7d of the second side plate 7b and covers the opening 7d of the second side plate 7b.

As shown in FIGS. 4, 5, 6A, and 6B, the spool supporting structure 15 comprises a spool supporting portion 17 and a rotating member 19.

Spool Supporting Portion

As shown in FIGS. 1, 4, 6A, and 6B, the spool supporting portion 17 is detachably mounted on the reel body 1 via the rotating member 19. The spool supporting portion 17 is disposed between the spool axis CA and the rotating member 19 in the radial direction.

As shown in FIGS. 6A and 6B, the spool supporting portion 17 is configured so as to be able to support the other end of the spool shaft 14. The spool supporting portion 17 is detachably mounted on the reel body 1. The spool supporting portion 17 rotatably holds the rotating member 19.

The spool supporting portion 17 comprises a shaft supporting portion 17a, a tubular portion 17b, and a disc portion 17c. The shaft supporting portion 17a rotatably supports the other end of the spool shaft 14. Specifically, the shaft supporting portion 17a is formed in a substantially tubular shape. The center of the shaft supporting portion 17a is coaxial with the spool axis CA.

The other end of the spool shaft 14 is disposed on the inner peripheral portion of the shaft supporting portion 17a. A bearing 16 is disposed between the inner peripheral surface of the shaft supporting portion 17a and the outer peripheral surface of the other end of the spool shaft 14. That is, the shaft supporting portion 17a rotatably supports the other end of the spool shaft 14 via the bearing 16.

The tubular portion 17b is formed in a substantially tubular shape. The tubular portion 17b is disposed spaced apart from the shaft supporting portion 17a in the radial direction. The rotating member 19 is disposed on the outside of the tubular portion 17b in the radial direction.

As shown in FIGS. 6A and 6B, the tubular portion 17b includes a hole portion 17d and a positioning protrusion 17e (refer to FIG. 4). Here, the tubular portion 17b includes a plurality of (for example, three) hole portions 17d and at least one (for example, one) positioning protrusion 17e.

Each hole portion 17d is for inserting a retaining member 21 (described later) from the inner circumferential side of the tubular portion 17b toward the rotating member 19. Each hole portion 17d extends through the tubular portion 17b in the radial direction. The hole portions 17d are disposed at intervals in the circumferential direction. For example, the hole portions 17d are disposed at intervals of 60 degrees in the circumferential direction.

As shown in FIG. 4, the positioning protrusion 17e restricts the rotation of the spool supporting portion 17 relative to the reel body 1. The positioning protrusion 17e is disposed on the outer circumferential portion of the tubular portion 17b. In particular, the positioning protrusion 17e is integrally formed with the outer circumferential portion of the tubular portion 17d, and protrudes radially outward from the outer circumferential portion of the tubular portion 17d. The positioning protrusion 17e is disposed in a positioning recess 7g (refer to FIGS. 3A and 3B) of the reel body 1 (opening 7d).

As shown in FIGS. 6A and 6B, the disc portion 17c connects the shaft supporting portion 17a and the tubular portion 17b. The disc portion 17c is formed in a substantially discoid shape. The shaft supporting portion 17a is integrally formed on the inner circumferential portion of the disc portion 17c. The tubular portion 17b is integrally formed on the outer circumferential portion of the disc portion 17c.

As shown in FIGS. 1 and 4, an opening 17g for operating an adjustment dial 20 is disposed on the disc portion 17c. In addition, as shown in FIGS. 6A and 6B, an annular recess 17f for disposing the adjustment dial 20 (refer to FIGS. 1 and 4) therein is formed on the inner surface of the disc portion 17c. Here, the adjustment dial 20 is an operation member for adjusting the braking force of the spool 10. The adjustment dial 20 constitutes a spool braking mechanism 30 (refer to FIGS. 6A and 6B) for adjusting the braking force of the spool 10. The configuration, operation, etc. of the spool braking mechanism 30 are not particularly described in detail in the present embodiment.

Rotating Member

The rotating member 19 is used to attach the spool supporting portion 17 to the reel body 1 and remove the spool supporting portion 17 from the reel body 1. The rotating member 19 is configured so as to be capable of connecting the spool supporting portion 17 to the reel body 1.

As shown in FIGS. 1, 2A, and 2B, the rotating member 19 is disposed between the reel body 1 and the spool supporting portion 17. In particular, the rotating member 19 is disposed between the opening 7d of the second side plate 7b and the spool supporting portion 17 in the radial direction. The rotational center of the rotating member 19 is coaxial with the spool axis CA.

As shown in FIGS. 2A and 2B, the rotating member 19 is disposed on the reel body 1 (for example, the frame 7) so as to be capable of rotating between a mounting position (one example of a second position; refer to FIG. 2A) and a detaching position (one example of a first position; refer to FIG. 2B). In particular, the rotating member 19 engages the frame 7, for example, the opening 7d of the second side plate 7b, so as to be capable of rotating between the mounting position and the detaching position.

Here, the mounting position is a position in which the spool supporting portion 17 cannot be removed from the reel body 1. In the mounting position the rotating member 19 is configured to be immovable relative to the reel body 1 in the first axial direction.

The detaching position is a position in which the spool supporting portion 17 can be removed from the reel body 1. In the detaching position the rotating member 19 is configured to be movable relative to the reel body 1 in the first axial direction away from spool 10.

Figure 5:
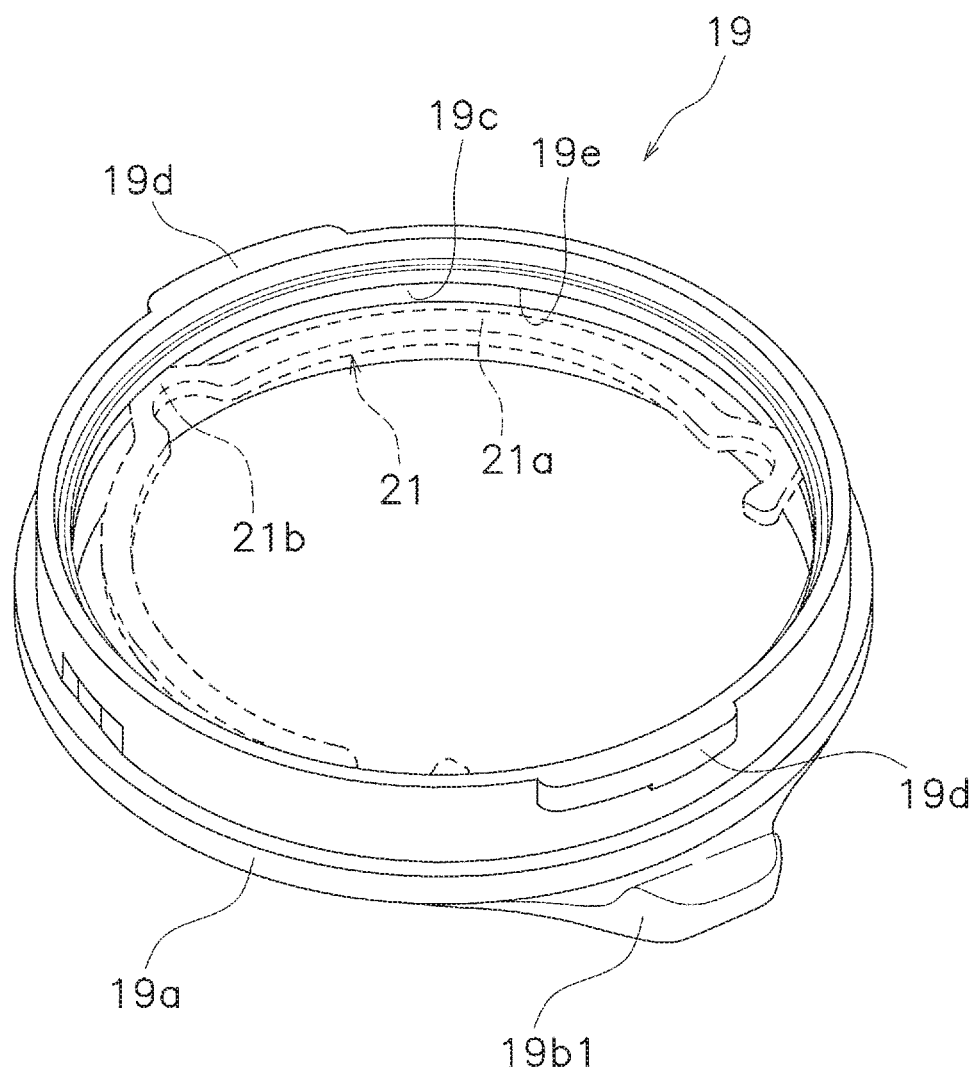
FIG. 5 is a perspective view of a rotating member.

In addition, as shown in FIGS. 5, 6A, and 6B, the rotating member 19 is disposed so as to be rotatable relative to the spool supporting portion 17.

As shown in FIGS. 4 and 5, the rotating member 19 includes a rotating portion 19a, a first operating portion 19b1 (one example of a radially outside portion; one example of a projecting portion), and a second operating portion 19b2 (one example of a radially outside portion; one example of an opposing portion). The rotating portion 19a is formed in a substantially annular shape. The rotating portion 19a is disposed on the outer circumferential portion of the spool supporting portion 17, for example on the outer circumferential surface of the tubular portion 17b.

As shown in FIG. 5, the rotating portion 19a has an annular groove 19c and a bayonet 19d. The annular groove 19c is a groove that is formed in an annular shape. The annular groove 19c is formed on the inner circumferential surface of the rotating portion 19a. The annular groove 19c extends in the circumferential direction.

The bayonet 19d is disposed on the outer circumferential portion of the rotating portion 19a. Here, a plurality of (for example, two) bayonets 19d are integrally formed on the outer circumferential portion of the rotating portion 19a.

Each bayonet 19d is a protrusion that protrudes radially outward from the outer circumferential portion of the rotating portion 19a. The bayonets 19d are disposed at intervals in the circumferential direction. For example, the bayonets 19d are disposed at intervals of 180 degrees in the circumferential direction. That is, the bayonets 19d are disposed facing each other in the radial direction.

In the embodiment in which the rotating member 19 is attached to, for example, the opening 7d of the second side plate 7b of the reel body 1, each bayonet 19d is disposed in each guide recess 7e (refer to FIGS. 3A and 3B) of the opening 7d, and moves in an axial direction approaching the spool 10. Then, when respectively reaching the positions of the bayonet grooves 7f, the bayonets 19d move along the bayonet grooves 7f in the circumferential direction. Then, the bayonets 19d abut the distal end portions 7h of the bayonet grooves 7f. The bayonets 19d are thereby positioned in the opening 7d of the second side plate 7b. This position is the mounting position.

In the embodiment in which the rotating member 19 is removed from, for example, the opening 7d of the second side plate 7b of the reel body 1, each bayonet 19d moves in each bayonet groove 7f in the circumferential direction, from the distal end portion 7h of each bayonet groove 7f toward each guide recess 7e. Then, each bayonet 19d reaches each guide recess 7e. This position is the detaching position. Then, each bayonet 19d moves from each guide recess 7e in the axial direction away from the spool 10. The engagement between the bayonets 19d and the opening 7d of the second side plate 7b is thereby released.

The first operating portion 19b1 shown in FIGS. 2A and 2B is used when rotating the rotating portion 19a relative to the reel body 1. For example, the first operating portion 19b1 is also used when removing the spool supporting portion 17, which rotatably supports the rotating portion 19a, from the reel body 1.

More specifically, the rotating portion 19a is rotated by an angler engaging a finger with the first operating portion 19b1 to carry out a rotation operation. In addition, the spool supporting portion 17 is removed by the angler engaging a finger with the first operating portion 19b1 to carry out a pressing operation.

As shown in FIGS. 2A, 2B, 6A, and 6B, the first operating portion 19b1 is disposed on the rotating portion 19a. Here, the first operating portion 19b1 is disposed on the outside of the rotating member 19 in the radial direction, for example, on the outside of the rotating portion 19a in the radial direction. In particular, the first operating portion 19b1 protrudes radially outward from the rotating portion 19a and is integrally formed with the rotating portion 19a.

The first operating portion 19b1 is disposed on the outside of the opening 7d. For example, the first operating portion 19b1 is disposed on the outside of the opening 7d in the radial direction. As shown in FIGS. 6A and 6B, gaps G1, G2 are disposed between the first operating portion 19b1 and the outer surface of the reel body 1. In particular, gaps G1, G2 are disposed between the first operating portion 19b1 and the outer surface of the reel body 1, between the mounting position and the detaching position.

When the rotating member 19 is in the mounting position (refer to FIG. 2A), the first operating portion 19b1 is disposed such that it is possible to grip the reel body 1. In particular, when the rotating member 19 is in the mounting position the first operating portion 19b1 is disposed on the inside of the outer surface of the reel body 1 in the radial direction, for example, of the outer surface of the second side plate 7b in the radial direction, when viewing the rotating member 19 from the outside in the axial direction.

More specifically, as shown in FIGS. 2A and 6A, the first operating portion 19b1 is disposed on the inside of an outside portion 7j in the radial direction, where the distal end portion of the first operating portion 19b1 opposes the reel body 1 (for example, second side plate 7b). Here, the first operating portion 19b1 is disposed on the inside of the outer circumferential portion 7j of the stepped portion 7i in the radial direction.

When the rotating member 19 is in the detaching position (refer to FIGS. 2B and 6B), the first operating portion 19b1 protrudes farther outside than the reel body 1 in the radial direction away from the spool axis CA.

For example, as shown in FIG. 6B, when the rotating member 19 is in the detaching position the distal end portion of the first operating portion 19b1 is disposed spaced apart from the outer surface of the reel body 1 by a distance D1 in the radial direction away from the spool axis CA. The distance D1 is the distance between the distal end portion of the first operating portion 19b1 and the reel body 1 in the radial direction. As a result of this distance D1 between the distal end portion of the first operating portion 19b1 and the reel body 1, the first operating portion 19b1 can be operated when removing the spool supporting portion 17 from the reel body 1

In addition, when the rotating member 19 is in the detaching position (refer to FIG. 6B), a gap G2 is disposed between the first operating portion 19b1 and the outer surface of the reel body 1. In particular, in this embodiment, a gap G2 is disposed between the outer surface of the reel body 1 and the inner surface of the first operating portion 19b1 that opposes the outer surface of the reel body 1.

A second operating portion 19b2 shown in FIGS. 2A and 2B is used when rotating the rotating portion 19a relative to the reel body 1. For example, the second operating portion 19b2 is also used when removing the spool supporting portion 17, which turnably supports the rotating portion 19a, from the reel body 1.

More specifically, the rotating portion 19a is rotated by an angler by engaging a finger with the second operating portion 19b2 and carrying out a rotation operation. In addition, the spool supporting portion 17 is removed by the angler by engaging a finger with the second operating portion 19b2 and carrying out a pressing operation.

As shown in FIGS. 2A, 2B, 6A, and 6B, the second operating portion 19b2 is disposed on the rotating portion 19a. Here, the second operating portion 19b2 is disposed on the outside of the rotating member 19 in the radial direction, for example, on the outside of the rotating portion 19a in the radial direction. In particular, the second operating portion 19b2 protrudes radially outward from the rotating portion 19a and is integrally formed with the rotating portion 19a.

The second operating portion 19b2 is disposed spaced apart from the first operating portion 19b1 in the circumferential direction. Here, the second operating portion 19b2 is disposed spaced apart from the first operating portion 19b1 in the circumferential direction at intervals of 180 degrees.

The second operating portion 19b2 is disposed on the outside of the opening 7d. For example, the second operating portion 19b2 is disposed on the outside of the opening 7d in the radial direction. As shown in FIGS. 6A and 6B, gaps G3, G4 are disposed between the second operating portion 19b2 and the outer surface of the reel body 1. In particular, gaps G3 and G4 are disposed between the distal end portion of the second operating portion 19b2 and the outer surface of the reel body 1, between the mounting position and the detaching position.

When the rotating member 19 is in the mounting position (refer to FIGS. 2A and 6A), the second operating portion 19b2 is disposed such that it is possible to grip the reel body 1. In particular, when the rotating member 19 is in the mounting position, the second operating portion 19b2 is disposed on the inside of the outer surface of the reel body 1 in the radial direction, for example, of the outer surface of the second side plate 7b in the radial direction, when viewing the rotating member 19 from the outside in the axial direction.

More specifically, the second operating portion 19b2 is disposed on the inside of an outside portion 7k in the radial direction, where the distal end portion of the second operating portion 19b2 opposes the reel body 1 (for example, the second side plate 7b). Here, the second operating portion 19b2 is disposed on the inside of the outer circumferential portion 7k of the stepped portion 7b in the radial direction.

As shown in FIG. 6B, when the rotating member 19 is in the detaching position the second operating portion 19b2 is disposed opposing the reel body 1 in the axial direction.

For example, when the rotating member 19 is in the detaching position the distal end portion of the second operating portion 19b2 is disposed spaced apart from the outer surface of the reel body 1 by a distance D2 in the axial direction. Here, the distance D2 is an interval in the axial direction of the gap G4.

In particular, in this case a distance D2 is disposed between the outer surface of the reel body 1 and the inner surface of the second operating portion 19b2 that opposes the outer surface of the reel body 1. As a result of this distance D2 between the distal end portion of the second operating portion 19b2 and the reel body 1, the second operating portion 19b2 can be operated when removing the spool supporting portion 17 from the reel body 1.

A rotating member 19 having the configuration described above is disposed so as to be capable of rotating with respect to the spool supporting portion 17, for example, via a retaining member 21. In particular, as shown in FIGS. 5, 6A, and 6B, a mounting portion 21a of the retaining member 21 is disposed on the inner circumferential portion of the tubular portion 17b of the spool supporting portion 17. In addition, a restricting portion 21b of the retaining member 21 is disposed in the annular groove 19c of the rotating member 19 via the hole portion 17d of the spool supporting portion 17. The rotating member 19 is thereby retained in the axial direction with respect to the spool supporting portion 17, and can be rotated in the circumferential direction with respect to the spool supporting portion 17.

Assembling the Spool Supporting Structure

The spool supporting structure 15 is assembled in the following manner. First, a rotating member 19 is disposed on the outside of the spool supporting portion 17 in the radial direction. In this state the annular groove 19c of the rotating member 19 is disposed opposing each hole portion 17d of the tubular portion 17b of the spool supporting portion 17 in the radial direction.

Next, an adjustment dial 20 is disposed in the annular recess 17f of the spool supporting portion 17, and the retaining member 21 is attached to the spool supporting portion 17 via an annular lid member 23. Finally, the retaining member 21 and the lid member 23 are positioned by a securing member, for example, a screw member 22.

A spool supporting structure 15 assembled in this manner is attached to the reel body 1 in the following manner.

In a state in which the rotating member 19 is disposed in a detaching position with respect to the spool supporting portion 17, each bayonet 19d of the rotating member 19 shown in FIG. 4 is disposed in each guide recess 7e of the reel body 1 (opening 7d) shown in FIG. 3A, and the positioning protrusion 17e of the spool supporting portion 17 shown in FIG. 4 is disposed in the positioning recess 7g of the reel body 1 (opening 7d) shown in FIG. 3A.

In this state the spool supporting structure 15 is pushed toward the spool 10. At this time an end portion of the spool shaft 14 is rotatably supported by the shaft supporting portion 17a of the spool supporting portion 17 via the bearing 16.

Next, as shown in FIG. 2B, when the rotating member 19 is turned in the rotational direction R2 each bayonet 19d of the rotating member 19 shown in FIG. 4 moves in the circumferential direction along each bayonet groove 7f shown in FIG. 3A. The bayonets 19d then abut the distal end portions 7h of the bayonet grooves 7f. The position of the rotating member 19 thereby changes from the detaching position (refer to FIG. 2B) to the mounting position (refer to FIG. 2A), and the spool supporting structure 15 is attached to the reel body 1.

For a spool supporting structure 15 attached to the reel body 1 in this manner, the spool supporting structure 15 can be removed from the reel body 1 by carrying out a procedure that is the reverse of the above-described mounting procedure. Accordingly, the removal procedure will be described only briefly.

The rotating member 19 is rotated in the rotational direction R1 (refer to FIG. 2A) with respect to the reel body 1 and the spool supporting portion 17, so as to change the position from the mounting position (refer to FIG. 2A) to the detaching position (refer to FIG. 2B).

For example, by pressing the first operating portion 19b1 and the second operating portion 19b2 of the rotating member 19 in the circumferential direction, the position of the rotating member 19 changes from the mounting v (refer to FIG. 2A) to the detaching position (refer to FIG. 2B). In this state the spool supporting structure 15 is removed from the reel body 1 by pressing the first operating portion 19b1 and the second operating portion 19b2 in the axial direction away from the spool 10, by utilizing the distances D1, D2.

OTHER EMBODIMENTS

Although an embodiment of the present invention has been presented heretofore, the present invention is not limited to this embodiment, and various modifications can be made without departing from the scope of the invention.

In the embodiment described above, an example is illustrated in which the first operating portion 19b1 protrudes from the reel body 1 in the radial direction when the rotating member 19 is in the detaching position; however, the second operating portion 19b2 may be configured in the same manner as the first operating portion 19b1.

In the embodiment described above, an example is illustrated in which the first operating portion 19b1 protrudes from the reel body 1 in the radial direction when the rotating member 19 is in the detaching position; however, the first operating portion 19b1 may be configured in the same manner as the second operating portion 19b2.

In the embodiment described above, an example is illustrated in which the spool 10 is configured so as to be able to rotate integrally with the spool shaft 14; however, the spool 10 may be supported so as to be able to rotate with respect to the spool shaft 14.

In the embodiment described above, an example is illustrated in which the rotational center of the rotating member 19 is coaxial with the spool axis CA; however, the rotational center of the rotating member 19 may be offset from the spool axis CA.

In the embodiment described above, an example is illustrated in which the rotating member 19 is disposed so as to be capable of rotating with respect to the spool supporting portion 17 by using a retaining member 21; however, the rotating member 19 may be disposed so as to engage with the spool supporting portion 17 in any manner, as long as the rotating member 19 can be rotated relative to the spool supporting portion 17.

In the embodiment described above, an example is illustrated in which the adjustment dial 20 is mounted on the spool supporting structure 15. However, the present invention can be applied to a dual-bearing reel that does not comprise an adjustment dial 20 such as a spool braking mechanism 30.

What is claimed is:

1. A dual-bearing reel, comprising:
    a spool around which a fishing line is capable of being wound;
    a spool shaft disposed at a rotational center of the spool;
    a spool supporting portion configured to support one end of the spool shaft;
    a body portion on which the spool supporting portion is detachably mounted, and
    a rotating member configured to connect the spool supporting portion to the body portion, and rotate between a first position in which the spool supporting portion is capable of being removed from the body portion and a second position in which the spool supporting portion is not capable of being removed from the body portion, a rotational center of the rotating member being coaxial with the rotational center of the spool,
    when in the first position, a radially outside portion of the rotating member is spaced from the body portion in at least one of a first radial direction away from the rotational center of the spool, and a first axial direction along the rotational center of the spool, and
    when in the second position, the radially outside portion is disposed on an inside of an outer surface of the body portion in the first radial direction, when viewing the rotating member from an outside in the first axial direction.

2. The dual-bearing reel according to claim 1, wherein when the rotating member is in the first position, the radially outside portion is operable due to being spaced from the body portion such that the spool supporting portion is removable from the body portion, and
    when the rotating member is in the second position, the radially outside portion is disposed such that the body portion can be gripped.

3. The dual-bearing reel according to claim 1, wherein when in the first position the rotating member is movable relative to the reel body in the first axial direction away from spool, and
    when in the second position the rotating member is immovable relative to the reel body in the first axial direction.

4. The dual-bearing reel according to claim 1, wherein the body portion has an opening for disposing the rotating member, and
    the radially outside portion is disposed on an outside of the opening.

5. The dual-bearing reel according to claim 1, wherein the radially outside portion has an opposing portion opposing the body portion in a second axial direction along the rotational center, when the rotating member is in the first position, and
    an outer peripheral portion of the opposing portion is spaced from the body portion in the second axial direction.

6. A dual-bearing reel, comprising:
    a spool around which a fishing line is capable of being wound;
    a spool shaft disposed at a rotational center of the spool;
    a spool supporting portion configured to support one end of the spool shaft;
    a body portion on which the spool supporting portion is detachably mounted; and
    a rotating member configured to connect the spool supporting portion to the body portion, and rotate between a first position in which the spool supporting portion is capable of being removed from the body portion and a second position in which the spool supporting portion is not capable of being removed from the body portion,
    when in the first position, a radially outside portion of the rotating member is spaced from the body portion in at least one of a first radial direction away from the rotational center, and a first axial direction along the rotational center, and
    when in the second position, the radially outside portion is disposed on an inside of an outer surface of the body portion in the first radial direction, when viewing the rotating member from an outside in the first axial direction,
    the radially outside portion having a projecting portion that protrudes farther outside than the body portion in a second radial direction away from the rotational center when the rotating member is in the first position, and
    a distal end portion of the projecting portion being spaced from the body portion in the second radial direction.

7. The dual-bearing reel according to claim 6, wherein a gap is disposed between the projecting portion and the outer surface of the body portion.

8. The dual-bearing reel according to claim 6, wherein the body portion has a stepped portion opposing the projecting portion in the first axial direction, when the rotating member is in the second position.

9. A dual-bearing reel, comprising:
    a spool around which a fishing line is capable of being wound;
    a spool shaft disposed at a rotational center of the spool;
    a spool supporting portion configured to support one end of the spool shaft;
    a body portion on which the spool supporting portion is detachably mounted; and
    a rotating member configured to connect the spool supporting portion to the body portion, and rotate between a first position in which the spool supporting portion is capable of being removed from the body portion and a second position in which the spool supporting portion is not capable of being removed from the body portion,
    when in the first position, a radially outside portion of the rotating member is spaced from the body portion in at least one of a first radial direction away from the rotational center, and a first axial direction along the rotational center; and
    when in the second position, the radially outside portion is disposed on an inside of an outer surface of the body portion in the first radial direction, when viewing the rotating member from an outside in the first axial direction,
    the radially outside portion having a projecting portion that protrudes farther outside than the body portion in a second radial direction away from the rotational center when the rotating member is in the first position, and an opposing portion opposing the body portion in a second axial direction along the rotational center when the rotating member is in the first position, a distal end portion of the projecting portion being spaced from the body portion in the second radial direction, and an outer peripheral portion of the opposing portion being spaced from the body portion in the second axial direction.

* * * * *